United States Patent [19]

Land et al.

[11] Patent Number: 4,965,784
[45] Date of Patent: Oct. 23, 1990

[54] METHOD AND APPARATUS FOR BISTABLE OPTICAL INFORMATION STORAGE FOR ERASABLE OPTICAL DISKS

[75] Inventors: Cecil E. Land; Ira D. McKinney, both of Albuquerque, N. Mex.

[73] Assignee: Sandia Corporation, Albuquerque, N. Mex.

[21] Appl. No.: 200,095

[22] Filed: May 31, 1988

[51] Int. Cl.$^5$ .............................................. G11B 7/00
[52] U.S. Cl. .................................. 369/100; 369/275.2
[58] Field of Search ............... 365/108, 109, 117, 122; 360/114; 369/13, 14, 15, 100, 110, 275, 276

[56] References Cited

U.S. PATENT DOCUMENTS

| | | | |
|---|---|---|---|
| 3,702,724 | 11/1972 | Land et al. | 365/109 |
| 3,906,462 | 9/1975 | Feinleib et al. | 365/109 |
| 3,998,523 | 12/1976 | Otomo | 365/117 |
| 4,158,201 | 6/1979 | Smith et al. | 365/109 |
| 4,391,901 | 7/1983 | Land et al. | 430/495 |
| 4,477,852 | 10/1984 | Ota et al. | 369/13 |
| 4,495,530 | 1/1985 | Yanagida | 369/13 |
| 4,530,080 | 7/1985 | Aoi et al. | 369/45 |
| 4,549,287 | 10/1985 | Hatano et al. | 369/13 |
| 4,561,032 | 12/1985 | Matsumoto et al. | 369/13 |
| 4,569,035 | 2/1986 | Tomita | 369/13 |
| 4,586,161 | 4/1986 | Skoda | 369/13 |
| 4,610,009 | 9/1986 | Connell | 369/13 |
| 4,638,470 | 1/1987 | Connell et al. | 369/13 |
| 4,682,311 | 7/1987 | Matsubayashi et al. | 369/13 |
| 4,825,428 | 4/1989 | Toki | 369/13 |

OTHER PUBLICATIONS

C. Land & P. Peercy, "A Review of the Effects of Ion Implantation on the Photoferroelectric Properties of PLZT Ceramics", *Ferroelectrics*, vol. 45, 1982, pp. 25–43.
C. Land, "Photoferroelectric Image Storage in Antiferroelectric-Phase PLZT Ceramics", *IEEE Transactions on Electron Devices*, vol. ED-26, No. 8, Aug., 1979, pp. 1143–1147.
R. Freese, "Optical Disks Become Erasable", *IEEE Spectrum*, vol. 25, Feb., 1988, pp. 41–45.
C. Land et al., "Electrooptic Ceramics", *Applied Solid State Science*, vol. 4, pp. 137–233, Academic Press, Inc., 1974.

Primary Examiner—Donald McElheny, Jr.
Attorney, Agent, or Firm—Eugene Varndell; George H. Libman

[57] ABSTRACT

A method and an optical device for bistable storage of optical information, together with reading and erasure of the optical information, using a photoactivated shift in a field dependent phase transition between a metastable or a bias-stabilized ferroelectric (FE) phase and a stable antiferroelectric (AFE) phase in an lead lanthanum zirconate titanate (PLZT). An optical disk contains the PLZT. Writing and erasing of optical information can be accomplished by a light beam normal to the disk. Reading of optical information can be accomplished by a light beam at an incidence angle of 15 to 60 degrees to the normal of the disk.

30 Claims, 6 Drawing Sheets 4,965,784

METHOD AND APPARATUS FOR BISTABLE OPTICAL INFORMATION STORAGE FOR ERASABLE OPTICAL DISKS

BACKGROUND OF THE INVENTION

The present invention relates to a method of storing, erasing and reading binary optical information and, more particularly, to the use of photoactivated shifts in the phase transition between the ferroelectric (FE) and the antiferroelectric (AFE) phases within a polycrystalline PLZT (lead lanthanum zirconate titanate) film containing device to store, erase and read binary information. The U.S. Government has rights in this invention pursuant to Contract No. DE-AC04-76DP00789, awarded by the U.S. Department of Energy.

This application is related to U.S. Pat. application Ser. No. 200,104, filed May 31, 1988, by Cecil Lamb and assigned tot he assignee of this application.

Since the invention of the computer, efficient storage and retrieval of digital information has been a major area of interest. The objective has been to develop more convenient storage methods to hold more data and make the data easier to access. Present technologies include: microfilm, magnetic tape, floppy disks, CD-ROM, and write-once read-many (WORM) optical disks.

A major problem with the technologies available is that they use mechanical heads for reading, writing, and erasing which touch the recording material. A sudden vibration or dust particles cause the mechanical heads to physically bump into the recording material, which can damage it. These damaging events reduce the life and reliability of tapes and floppy disks. Although WORM disks are optical disks, information recorded on a WORM disk can neither be erased nor rerecorded. Another problem is that present disks are limited in the amount of storage space available.

Erasable magneto-optical disks have recently been added to the above technologies. See, for example, "Optical Disks Become Erasable," *IEEE Spectrum*, Vol. 25, 41-45 (Feb. 1988). The erasable magneto-optical disk is the only member of the present technology thus far, to provide for erasable optical storage. Although erasable magneto-optical disks are faster than the previous technology, problems associated with their use exist. For example, information may be erased or altered by certain magnetic fields within the proximity of the disk. Further, erasable magneto-optical disks may experience domain-wall migration, which is the tendency of magnetic patterns to bleed into adjacent areas. Also, erasable magneto-optical disks have limited write-erase cycle lifetimes of about $10^4$ cycles.

A photoferroelectric optical information storage device which uses the field-induced AFE-to-FE phase transition in AFE-phase PLZT compositions to store high-resolution, high-contrast optical information was described in "Photoferroelectric Image Storage in Antiferroelectric-Phase PLZT Ceramics," by Cecil E. Land, *IEEE Trans. on Electron Device*, Vol. ED-26, No. 8, 1143-1147 (1979). In this device, electric-field-induced AFE-to-FE phase transition is photoinhibited by exposure to near-UV light with photon energies equal to or greater than the band gap (about 3.4eV). This storage device employs an intrInsIc photoferroelectric effect similar to that occurring in FE-phase compositions. This photoferroelectric effect in the AFE-phase material provides a basis for erasable optical information storage such as photographic images with high resolution and contrast or holograms with large diffraction efficiencies. In unimplanted AFE-phase PLZT, the intrinsic photoferroelectric effect relies on photon absorption to photoexcite carriers into the conduction band and thereby to increase the threshold voltage for field-inducing the AFE-to-FE phase transition.

Both resolution and contrast of stored photographic images and the diffraction efficiency of stored holograms are substantially higher for storage in AFE-phase material than for comparable photoferroelectric storage in FE-phase compositions. The absence of domain structure in the AFE-phase removes a major source of light scattering and thereby increases contrast and/or diffraction efficiency of stored information.

SUMMARY OF THE INVENTION

It is the object of the present invention to provide an improved method and apparatus for reading, writing, and erasing optical information using an optical disk having a PLZT thin film material.

Upon further study of the specification and appended claims, further object and advantages of the present invention will become apparent to those skilled in the art.

DETAILED DESCRIPTION

The present invention uses a bistable PLZT (lead lanthanum zirconate titanate) thin film deposited on a disk substrate which can have preformed grooves delineating the bit storage paths, to produce an optical disk, which can be used to store and read optical information and which can be erased.

The optical disk can comprise a suitable conductive and reflective disk-shaped substrate coated first with a thin layer of PLZT material and then with a transparent conductive film overlaying the PLZT film. Alternatively, the optical disk can comprise a polished ceramic plate of AFE-phase PLZT material with transparent conductive electrodes, such as indium-tin oxide (ITO) electrodes, sputter-deposited on the two major surfaces of the ceramic plate.

Optical bistability of the thin PLZT film is achieved by either of the following methods:

(1) using the light activated shift of the field-dependent phase transition between a metastable ferroelectric (FE) phase and a stable antiferroelectric (AFE) phase in a nominally AFE-phase PLZT composition, or (2) using heat absorbed from a laser beam addressing of a FE-phase film to activate a phase transition from the FE phase to a nearby AFE, penferroelectric (PFE) or paraelectric (PE) phase.

The bistable PLZT thin film is preferably deposited on a suitable conductive and reflective disk substrate with preformed grooves to delineate the bit storage paths. This results in an optical storage device which constitutes an erasable optical disk. If the film is deposited on an optically flat, conductive and reflective substrate, the resulting optical disk may be used as a spatial light modulator or holographic storage medium.

Figure 1:
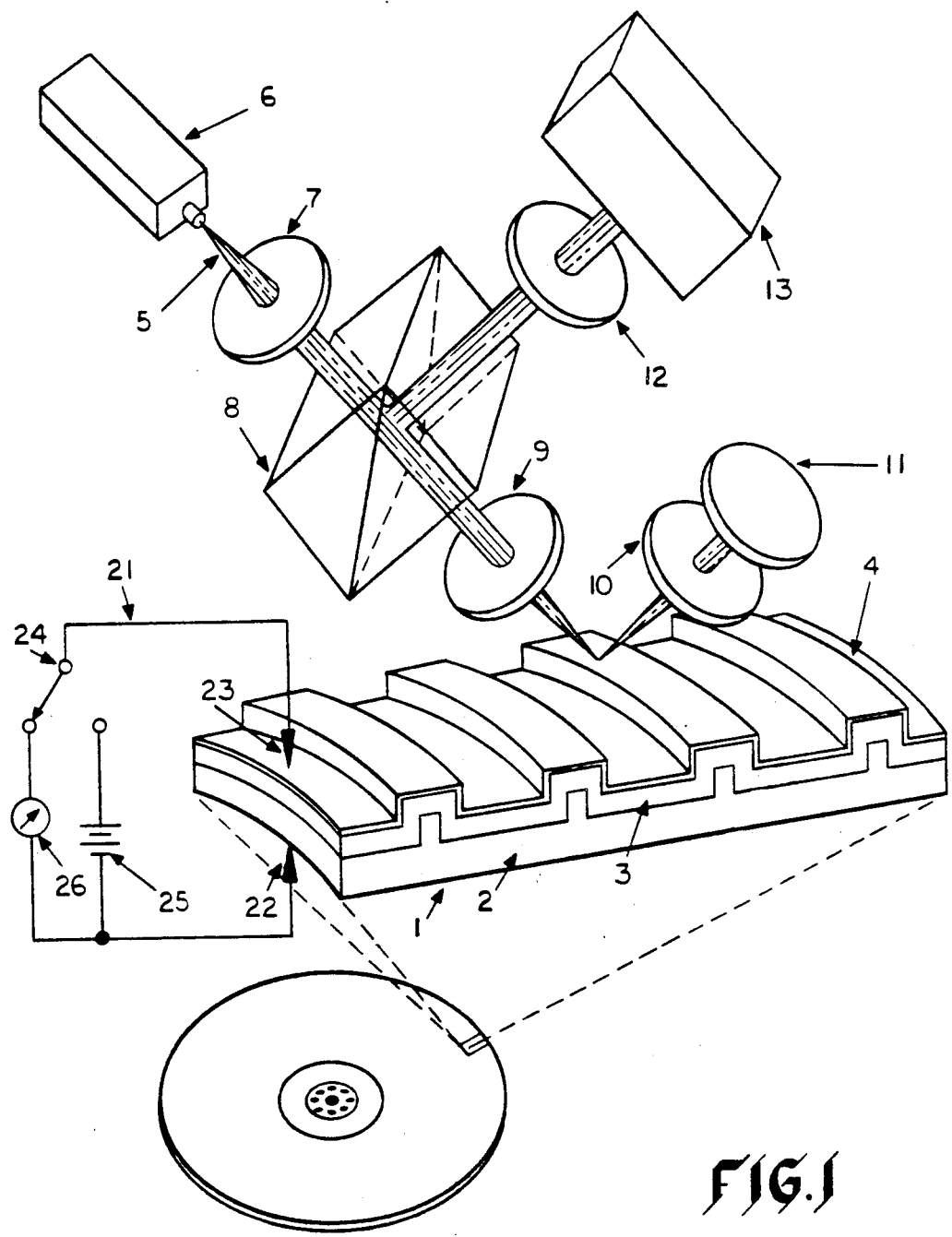
FIG. 1 illustrates the READ method and apparatus for four passes through the PLZT film.

FIG. 1 is a schematic diagram of the configuration of the read optics of this invention. The device includes optical disk 1 having a conductive and reflective substrate 2, a PLZT film 3, and an ITO film 4, a read laser beam 5 emitted from a laser generating device 6, lenses 7,9,10, a polarizing beam splitter 8, mirror 11, analyzer 12 and photodetector 13. The incidence angle of the read beam can be optimized to obtain maximum signal to noise ratio in the detector. This read scheme is applicable to either embodiment of the write-erase mechanism since, in both embodiments, readout involves detection of the presence of FE phase (e.g., for a binary 1) or AFE, PFE or PE phase (e.g., for a binary 0). Optical bistability is inherent in either embodiment, since the two phases represent stable, optically detectable states.

Figure 2:
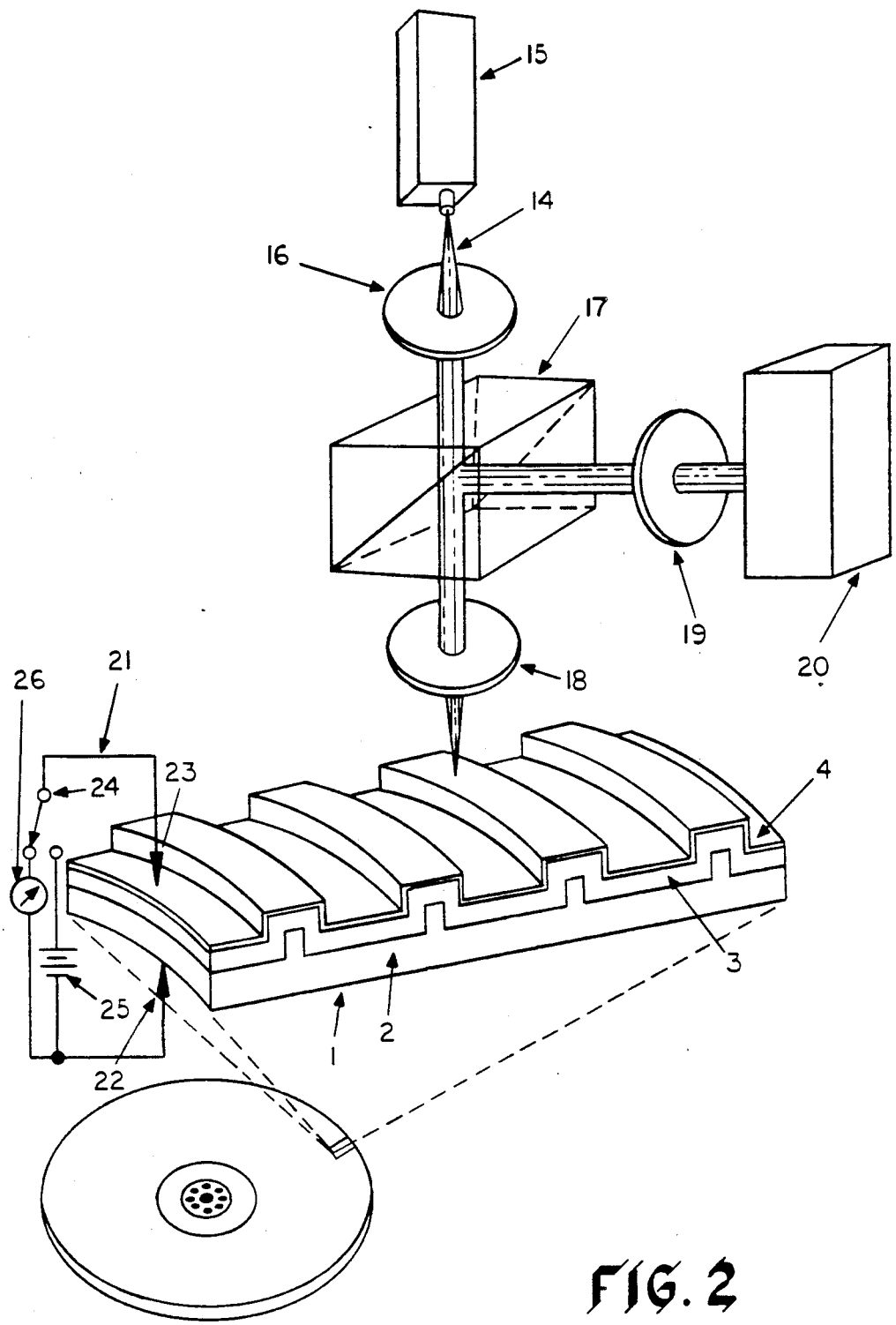
FIG. 2 illustrates the WRITE-ERASE method and apparatus with amplitude monitor.

FIG. 2 is a schematic diagram of the configuration of the write-erase optics for either embodiment of the invention. The device includes optical disk 1 having a conductive-reflective substrate 2, a PLZT film 3, and an ITO film 4, write-erase laser beam 14 emitted from a laser generating device 15, lenses 16, 18, a polarizing beam splitter 17, analyzer 19 and photodetector 20.

FIGS. 1 and 2 show a circuit 21 having contact points (or brushes) 22 and 23 respectively contacting the ITO film 4 and the conductive and reflective substrate 2. Circuit 21 also includes switch 24 for selectively connecting the circuit 21 to either dc current source 25 which may be a battery or to ammeter 26. The dc current source can provide one of two different electrical potentials across the optical disk or a portion thereof. The dc current source can provide a lower dc current bias field across the optical disk for writing information to the optical disk together with write laser beam 14, as shown in FIG. 2. The dc current source 25 also can provide a higher electrical potential across the optical disk for erasing stored information from the disk.

An alternative method of reading the stored information is shown in FIG. 2, which uses the write-erase optics shown therein. In this alternative reading method, switch 24 is connected to ammeter 25. The addressed area of the disk is illuminated while simultaneously monitoring the short-circuit photocurrent generated when each bit is addressed. Those bits in the FE phase (e.g., for a binary 1) will generate photocurrent when they are illuminated by the addressing beam; the bits in the AFE, the PFE or the PE phase (e.g., for a binary 0) will not generate photocurrent.

In the device shown in FIG. 1, switch 24 of circuit 21 can be optionally connected to ammeter and used for reading the photocurrent between contact points 22 and 23. This is useful in reading the stored information, as discussed above.

Bistable optical information storage devices which can store, erase and read optical information in accordance with the present invention can be attained using AFE-phase PLZT bulk ceramic compositions in the optical disk. For certain applications the bulk ceramic may be a suitable storage medium; however, in thin film form, the storage density is improved by an order of magnitude or more and both the time and the energy required to store a bit of information is substantially decreased. An optical device according to the present invention containing a PLZT film requires less write and erase energy and is significantly more durable than the previously known disks, such as those using ferromagnetic films. For example, ferromagnetic films can withstand about $10^4$ write and erase cycles prior to failure, while PLZT films should survive well beyond $10^{12}$ write and erase cycles. Preferably, the PLZT films are about 1 micron thick. Thinner films can be used but generally increase noise (lower S/N ratio). Thicker films can also be used, but usually have less resolution and require more energy for write and erase functions. The PLZT films can be prepared by rf magnetron sputtering, sol gel spinning and other well known techniques. The optical storage density of a PLZT thin film can be roughly equivalent to that of an erasable magnetic film (i.e., greater than 40 Mbits per $cm^2$), but the configuration of the write circuitry is greatly simplified for the PLZT film due to elimination of the biasing field coil. As described above, an electric field bias can be applied between the conductive substrate and a transparent conductive film overlaying the PLZT film.

An optical disk in accordance with the present invention can comprise AFE-phase PLZT ceramic plates, 100 to 300 microns thick, with ITO (indiumtin oxide) electrodes sputter-deposited on the two major surfaces. As mentioned above, the optical disk preferably comprises a thin film of PLZT material preferably about 1 micron thick deposited on a surface of a disk-shaped conductive-reflective substrate with ITO (indium-tin oxide) layer sputter deposited over the thin film of PLZT. Most preferably, the disk shaped substrate has spiral or concentric grooves of, for example, 1 micrometer wide and 70 nanometers deep. A PLZT material which can be used in the present invention has the general formula:

$$Pb_{1-x}La_x(Zr_yTi_z)_{1-x/4}O_3.$$

Preferable PLZT materials are where x=0.76 or 0.77, y=0.7 and z=0.3. Other PLZT materials can be used with the above-described general formula. For example, the ratio of Zr to Ti can vary between 68/32 and 85/15. When the amount x of La is varied, the amounts y and z respectively of Zr and Ti must be varied, so that the resulting PLZT material is on or near the boundary between the FE rhombohedral phase and the AFE orthorhombic phase and that the electric field threshold of the phase transition between a field-induced metastable or bias-stabilized FE phase and the stable AFE phase is sensitive to band-gap or visible light. Materials other than the PLZT materials described above can be used in the present invention if when exposed to light the threshold of the FE→AFE phase transition is shifted along the field axis toward the AFE→FE phase transition. Other PLZT compositions can be used in the present invention if optical bistability is achieved using heat absorbed from a laser beam to activate a phase transition from the FE phase to a nearby AFE, PFE or PE phase. Other phase transition materials can be used in the present invention if they behave in a similar manner.

The nomenclature PLZT X/70/30 is commonly used to refer to PLZT materials. PLZT X/70/30 denotes a solid solution with X atom percent La, 70 mole percent $PbZrO_3$ and 30 mole percent $PbTiO_3$ prepared according to the formula: $Pb_{1-x}La_x(Zr_{0.7}Ti_{0.3})_{1-x/4}O_3$, where x=0.01 X. Thus, the PLZT compositions preferred for use in the present invention are X/70/30, with X=7.6 or 7.7 percent La and 70/30 designating the ratio of lead zirconate to lead titanate in the solid solution. The composition with X=7.6 exhibits a field-induced metastable FE phase at room temperature, such as that illustrated by the P versus E hysteresis characteristic of FIG. 3. The X=7.7 composition exhibits a conventional AFE twin-loop P versus E hysteresis characteristic similar to that shown in FIG. 4.

The PLZT thin film or bulk ceramic materials usable in the present invention can be implanted with ions, such $H^+$, $He^+$, $Ne^+$, $Ar^+$, as well as chemically reactive ions from Fe, Cr and Al to increase the photosensitivity of the PLZT. Such materials are described in U.S. Pat. No. 4,391,901 of Cecil E. Land et al., issued July 5, 1983, which is incorporated herein by reference.

EXAMPLES

In the experiments performed below, polished ceramic plates, 0.2 to 0.3 mm thick, of AFE-phase PLZT material with transparent conductive ITO (indium-tin-oxide) electrodes sputter-deposited on the two major surfaces were employed. The experiments below are primarily concerned with the PLZT bulk ceramic material. This material enables the optical disk within a read and write-erase environment to store, read and erase data, as described above. The following experiments illustrate the properties of the PLZT ceramic materials which are useful in the present invention, but similar properties are exhibited by PLZT thin films of the same compositions.

The electric field threshold of the phase transition between a field-induced metastable FE phase or a bias-stabilized FE phase and the stable AFE phase is sensitive not only to band-gap light but also to visible light. When the material is exposed to light, the threshold of the FE→AFE phase transition is shifted along the field axis toward the AFE→FE phase transition. Therefore, if a dc bias field is applied at the threshold of the FE→AFE phase transition and the surface of the ceramic is exposed to spatially modulated light, the areas illuminated above the exposure energy threshold will switch to the AFE phase and the dark areas will remain in the FE phase. Optical information is thereby stored between two well-defined states: the metastable or biased FE and the stable AFE phases. If the initial state is a metastable FE phase, the stored information is nonvolatile hence it will remain after the bias field is removed.

Figure 3:
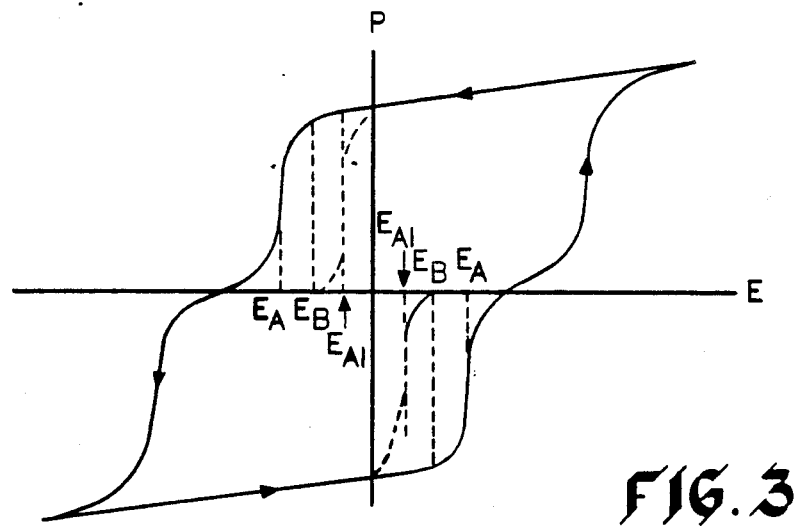
FIG. 3 shows the P versus E hysteresis characteristic for AFE-phase PLZT 7.6/70/30 which exhibits a field-induced metastable FE phase.

For compositions with a field-induced metastable FE phase, optical information storage is achieved by first field-inducing the FE phase, applying a biasing field $E_B$ near the knee of the FE→AFE transition threshold (FIG. 3), and then exposing a surface of the device to spatially modulated light. Both photographic and holographic images, as well as binary information, have been stored by this technique. The FE→AFE phase transition threshold shifts from $E_A$ to $E_{AI}$ in areas illuminated above the exposure energy threshold. The phase transition shift is illustrated in FIG. 3. The illuminated areas undergo a transition from the FE to the AFE phase, while the dark areas remain in the FE phase. In the FE phase, the PLZT grains (crystallites) are birefringent and there is at least one FE domain per grain. In the AFE phase, the PLZT is optically isotropic and there is no FE domain structure. Stored information is therefore optically detectable using plane-polarized light or coherent light and an interferometer. The grain sizes of the PLZT ceramics used in these experiments are about 5 micrometers. The ceramics can be fabricated with grain sizes from about 1 micrometer to 30 micrometers. Stored bits with diameters of about two to four grain diameters are possible in the polycrystalline bulk ceramic material. The grain sizes of polycrystalline PLZT films of the same composition can be as small as a few hundred angstroms or they can be as large as 1 micrometer (the nominal film thickness). Stored bits with diameters as small as 1 micrometer are possible.

An important aspect of this invention lies in the method of optical detection between the FE phase and the AFE, PFE or PE phase of the PLZT film. Optical information stored in the metastable FE phase is nonvolatile. The polar axes of the poled FE grains are aligned approximately normal to the substrate, hence they cannot be detected by plane polarized light which is also normal to the substrate, as in the case of the write-erase laser beam 14 (FIG. 2). When the read laser beam 5 is incident to the film at an angle from 15 to 60 degrees to the normal, as shown in FIG. 1, the beam polarization is converted from plane to elliptical by the retardation of the birefringent material. Retardations as large as 16 nm for four passes through a 1.2 micrometer thick film with 45 degree incident He-Ne laser light, have been measured. Retardations of half that value (for two passes of the beam) are sufficient for detection with high reliability. The incidence angle of the read beam 5 can be optimized to obtain maximum signal-to-noise ratio in the detector. This read scheme is applicable to either embodiment of the write erase mechanism since, in both embodiments, readout involves detection of the presence of the FE phase as opposed to the AFE, PFE or PE phases. In the AFE, PFE or PE phases, the PLZT material is optically isotropic on a macroscopic scale and there is no FE domain structure. The polarization of the read beam will therefore be unaffected by bits in either the AFE, the PFE or the PE phases.

An alternative method of optical detection between the FE phase and the AFE, PFE or PE phase of the PLZT film is to monitor the short-circuit photocurrent generated when the addressed area is illuminated with light using the write-erase optics of FIG. 2. Those bits in the FE phase (e.g., for a binary 1) will generate photocurrent at the disk terminals (between the top transparent electrode and the conductive substrate) when they are illuminated by the addressing beam; the bits in the AFE, PFE or PE phase (e.g., for a binary 0) will not generate photocurrent when illuminated by the addressing beam. The PLZT thin films are efficient photocurrent generators when they are addressed with near-UV light or light in the blue end of the visible spectrum.

Figure 4:
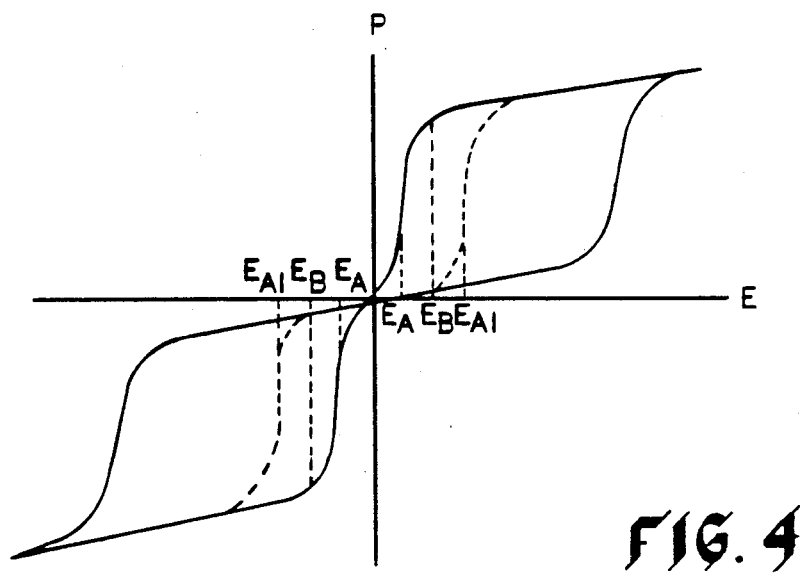
FIG. 4 show the P versus E hysteresis characteristic for AFE-phase PLZT 7.7/70/30 which has typical AFE-phase, twin-loop behavior. The field-induced .FE phase is unstable.

For compositions with a bias-stabilized FE phase, such as PLZT 7.7/70/30, optical information is stored, erased and read by a process similar to that described above for the metastable FE-phase material. This process is illustrated in FIG. 4. However, for the bias-stabilized FE phase, stored information is volatile, and it disappears when the stabilizing bias is removed.

Both the intrinsic and extrinsic photosensitivities of the AFE PTPS (phase transition photostorage) effect of the present invention depend on the proximity of the AFE composition to the room-temperature morphotropic phase boundary between the rhombohedral FE phase and the orthorhombic AFE phase. Furthermore, the photosensitivities are slightlY greater for compositions lying in the AFE phase region near the phase boundary than those in the FE phase region.

Optical bistability is inherent in the AFE PTPS processes as a result of the coexistence of the two phases which represent highly reproducible storage states. The optical storage density of a PLZT thin film is roughly equivalent to that of an erasable magnetic film (i.e. greater than 40 Mbits per $cm^2$), but the configuration of the write circuitry is greatly simplified for the PLZT film due to elimination of the biasing field coil. The electric field bias can be applied between the conductive substrate and a transparent conductive film overlaying the PLZT film.

Figure 5:
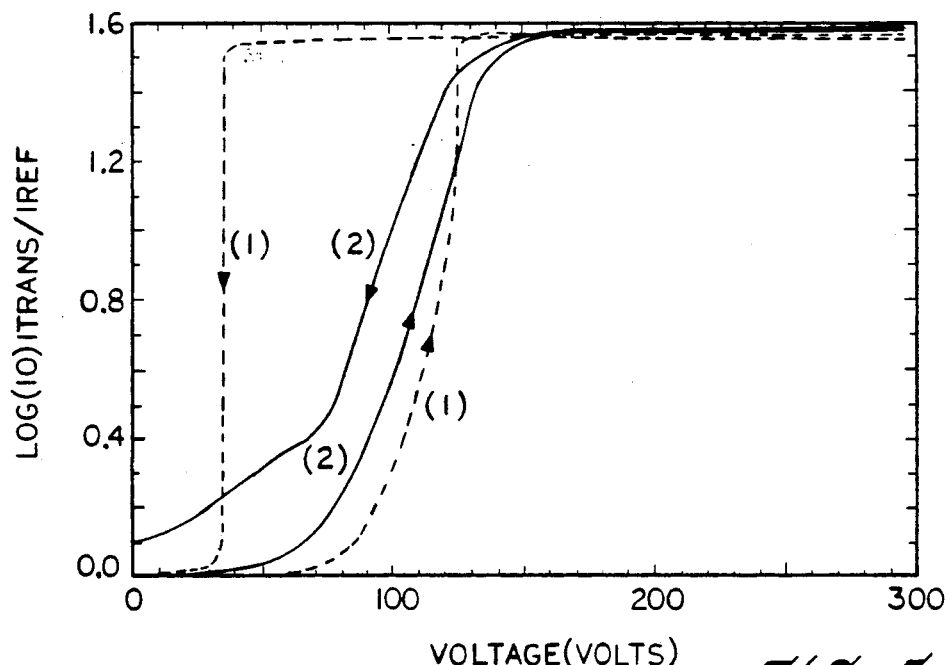
FIG. 5 .depicts the normalized intensity of transmitted He-Ne laser light versus applied voltage for an unimplanted PLZT 7.7/70/30 composition (Sample AK): (1) with no illumination, and (2) with 12 mW/cm$^2$ intensity white light illumination.
Figure 6:
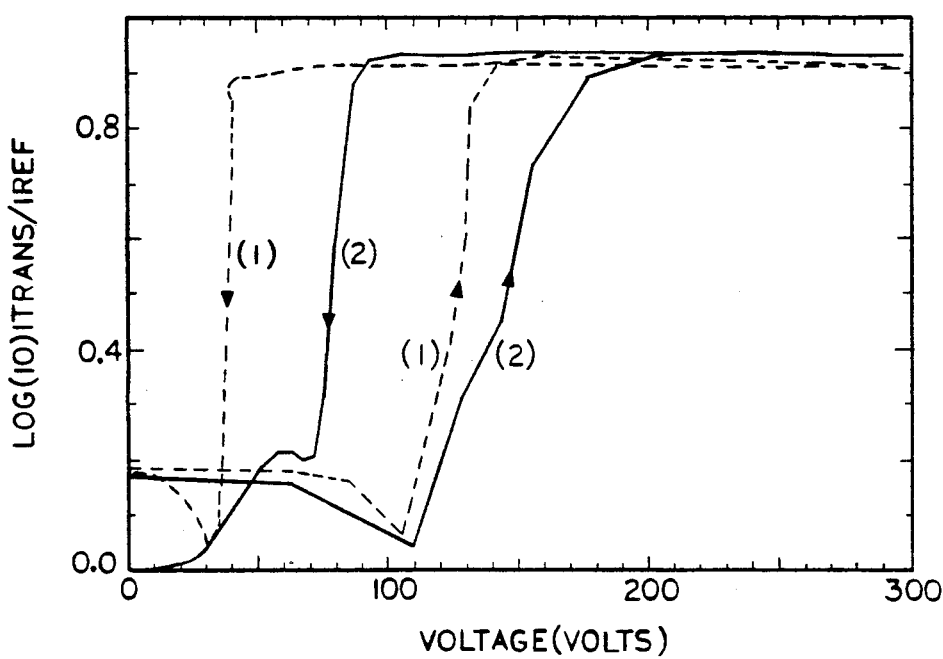
FIG. 6 depicts the normalized intensity of transmitted He-Ne laser light versus applied voltage for H+-implanted PLZT 7.6/70/30 composition Sample AO): (1) with no illumination, and (2) with 12 mW/cm$^2$ intensity white light illumination.

The visible photosensItivity of the AFE PTPS device can be observed as a shift in the threshold of the FE→AFE phase transition when the device is illuminated with white light from an incandescent source. The significance of incandescent illumination is the lack of UV component in the light and the fact that the band gap is in the near-UV at approximately 3.4 eV (365 nm). A qualitative measure of the photosensitivity based on the above observation was obtained by plotting the normalized intensity of transmitted polarized He-Ne laser light as a function of applied voltage while the ceramic was switched through the AFE→FE and the FE→AFE phase transitions, first with no illumination then with the surface illuminated with 12mW/$cm^2$ white light. FIG. 5 illustrates the shift along the voltage axis of the two phase transitions for unimplanted PLZT 7.7/70/30 (Sample AK) before and after illumination with white light as described above. Similar curves for an identical sample (Sample AO) implanted with $10^{16}$ 200 keV H+/$cm^2$ are shown in FIG. 6. Although these results are qualitative, they emphasize that the visible Photosensitivity of the FE→AFE phase transition shift is much higher than that of the AFE→FE transition.

Figure 7:
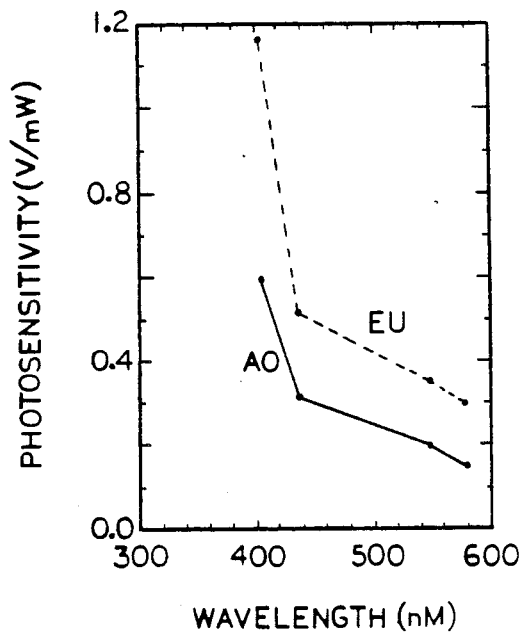
FIG.7 is a plot of the qualitative photosensitivity (V/mW) versus wavelength of illuminating light for H+-implanted PLZT 7.7/70/30 (Sample AO) and for Cr+N,e-implanted PLZT 7.6/70/30 (Sample EU).

A series of measurements similar to those described above were made on Sample AO using monochromatic rather than white light illumination at 404, 436, 546 and 579 nm. The results are summarized in FIG. 7 in terms of the FE→AFE phase transition voltage shift per milliwatt of illumination intensity versus wavelength of the illuminating light. Data for a sample of PLZT 7.6/70/30 (Sample EU) implanted with $10^{15}$ 500 keV Cr/$cm^2$ + $10^{15}$ 500 keV Ne/$cm^2$ is also plotted in FIG. 7. The curves of FIG. 7 show that both samples maintain reasonably high photosensitivities in the visible, and that the Cr+Ne implantation improves the visible photosensitivity compared to that of sample AO.

Figure 8:
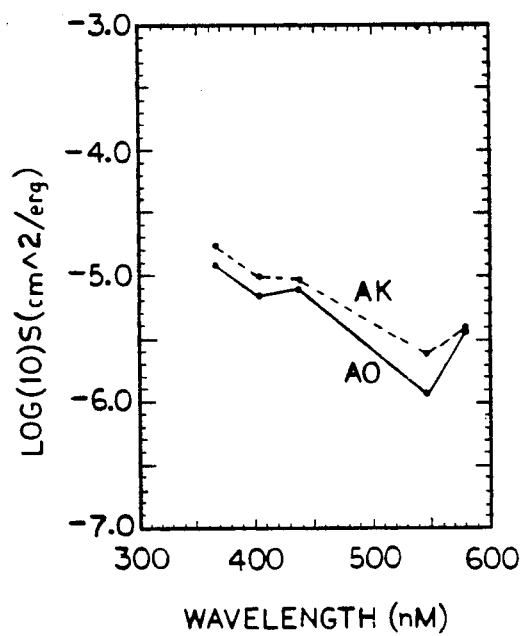
FIG. 8 is a plot of the Log$_{10}$ photosensitivity S versus wavelength for unimplanted PLZT 7.7/70/30 (Sample AK) and for H+-implanted PLZT. 7.7/70/30 (Sample AO).
Figure 9:
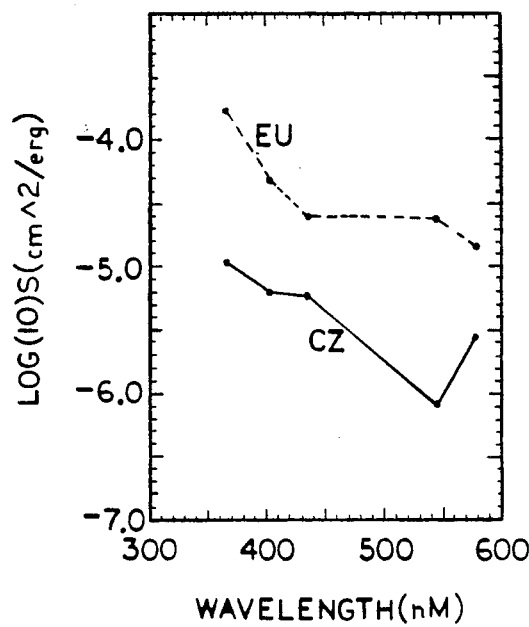
FIG. 9 is a plot of the Log$_{10}$ photosensitivity S versus wavelength for unimplanted PLZT 7.6/70/30 (Sample CZ) and for Cr+Ne-implanted PLZT 7.6/70/30 (Sample EU).

Quantitative measurements of photosensitivity as a function of wavelength were made for samples AK and AO, and the results are plotted in FIG. 8. The photosensitivity is essentially unaffected by the proton implantation in sample AO, and the photosensitivity of the implanted sample is actually slightly less than that of the unimplanted sample. Substantially different results were obtained for similar measurements on the PLZT 7.6/70/30 samples. The photosensitivity of an unimplanted sample (CZ) is improved an order of magnitude or more by Cr+Ne implantation (sample EU) as shown in FIG. 9. Since samples CZ and EU exhibit metastable FE phases, the experimental results demonstrate that the photosensitivity enhancement produced by ion implantation is comparable to that which would occur for FE phase compositions.

Figure 10:
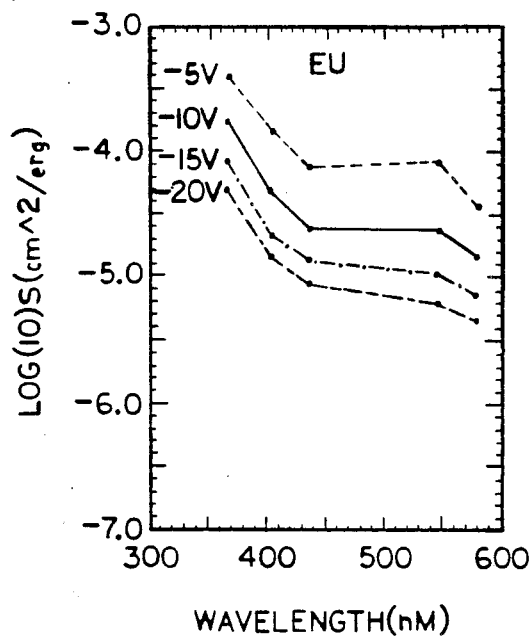
FIG. 10 is a plot of the Log$_{10}$ photosensitivity S versus wavelength for Cr+Ne-implanted PLZT 7.6/70/30 (Sample EU) for phase transition shift thresholds of 5, 10, 15 and 20 volts.

The threshold photosensitivities plotted in FIGS. 8 and 9 are calculated on the basis of a 10 volt shift in FE→AFE phase transition when the device is illuminated. For smaller shifts in the phase transition, the overall photosensitivity is increased: for larger shifts, the overall photosensitivity is decreased. This effect is illustrated in FIG. 10 for FE→AFE phase transition shifts of 5, 10, 15 and 20 volts. The wavelength dependence of the photosensitivity is essentially unaffected for the phase transition shifts shown in FIG. 10.

An erasable optical memory, as presented in this invention, uses light from one laser both to record and erase data (FIG. 2), and light from a second laser to read data (FIG. 1). To record bits, a pulse of a few nanoseconds duration illuminates a spot about 1 micrometer across in the PLZT thin film. In the first embodiment listed above, the light may be relatively low intensity near-UV, visible or infrared. The light activates a shift in the field threshold of the FE-AFE phase transition and the illuminated spot switches from FE to AFE phase. In the second embodiment above, the light may be of somewhat higher intensity infrared with sufficient energy to heat the addressed spot to a temperature in excess of the phase transition threshold between the FE and either the AFE, the PFE, or the PE phase. In both cases, the illuminated area of the film undergoes a phase transition from the FE to either the AFE, the PFE or PE phase. To erase stored information, a dc bias voltage is applied between the conductive substrate and a thin transparent conductive film such as indium-tin oxide (ITO), deposited on the exposed surface of the PLZT. The magnitude of the bias voltage is sufficient to pole the PLZT film to its initial FE state in the presence of illumination from the write-erase laser, but insufficient to pole the unilluminated area of the film. To erase all stored information on the disk, the bias voltage can be increased to a value sufficient to pole the unilluminated area of the PLZT film.

Photosensitivities of films for either embodiment of this invention are measurable using techniques which have been developed for determining the photosensitivities of bulk PLZT ceramic materials.

Optical bistability is inherent in the above described storage and retrieval device and process as a result of the coexistence of the two phases in the storage process. This offers an important advantage over the previously known photoferroelectric storage and retrieval devices, because of the stability of the stored information within the PLZT material. It has obvious advantages for storage of binary information in applications such as high-density audio or video disc-type storage modes. In addition to this advantage, this storage process is sensitive to visible as well as near-UV light, and the photosensitivity of this extrinsic photoeffect appears to be much higher in unmodified PLZT than that previously observed for the intrinsic photoferroelectric effect in FE-phase or AFE-phase material.

What is claimed is:

1. A method of bistable storage of optical information, which comprises:

providing a material capable of shifting between stable first antiferroelectric and second ferroelectric phases by applying at least one of electric energy and illumination energy thereto, applying an electrical field across a surface of the material, so that the material shifts from the first phase to the second phase, illuminating parts of the material, thereby causing the illuminated parts to shift back to the first phase, removing the illumination and electrical field so that the illuminated parts remain in the first phase and the unilluminated parts remain in the second phase, and directing a read light beam onto the portion of the material and determining the first and second phase parts thereof.

2. The method of claim 1, wherein the read light beam is at an angle of 15 to 60 degrees incident to normal of the material.

3. Apparatus for bistable optical information storage comprising:

optical disk means for storing binary information as a function of the ferroelectric/antiferroelectric phases at different locations on the disk surface;

write-erase means for writing and erasing binary optical information on and from a surface of the optical disk means, said write-erase means comprising:

electric means for applying an electric potential across said optical disk means; and light means for directing a write-erase light beam toward said disk surface to selectively alter said phases; and read means for reading binary optical information from said surface.

4. The apparatus of claim 3, wherein the means for applying an electrical potential across the disk means is capable of applying two different electrical potentials.

5. The apparatus of claim 3, wherein the read means includes means for directing a read light beam onto the disk means at an incidence angle of 15 to 60 degrees to the normal of the disk means; and said disk means includes a light reflecting layer on said surface.

6. The apparatus of claim 5, wherein the read means further includes:

focusing means for focusing the read light beam;

light beam polarization analyzing means for analyzing the polarization of the light beam reflected from the disk reflecting layer; and a photodetecting means for detecting the output of said analyzing mean.

7. The apparatus of claim 6, wherein said reflecting means includes mirror means for reflecting the light beam reflected from said layer means back along the path of the read light means; and said polarization analyzing means comprises:

a polarizing beam splitter to split the reflected light beam from the path;

light beam polarization analyzing means for analyzing the polarization of the split beam; and photodetecting means for detecting the output of said analyzing mean.

8. The apparatus of claim 5, wherein the optical disk means includes a layer of lead lanthanum zirconate titanate (PLZT).

9. The apparatus of claim 8 wherein the PLZT is PLZT 7.6/70/30.

10. The apparatus of claim 8, wherein the PLZT is PLZT 7.7/70/30.

11. The apparatus of claim 3, wherein:

the write-erase light means is directed at an angle of 90° to said surface, and the write-erase means further includes:

focusing means for focusing the write-erase light beam onto said surface;

a reflecting layer on said surface, wherein said beam is reflected back towards the light means; and reflected light detecting means comprising:

a polarizing beam splitter to split the reflected light beam from a path between said light means and said surface;

light beam polarization analyzing means for analyzing the polarization of the split beam; and photodetecting means for detecting the output of said analyzing mean.

12. The apparatus of claim 11, wherein the optical disk means includes a layer of ferroelectric material.

13. The apparatus of claim 12, wherein the layer of ferroelectric material is capable of shifting between stable first and second phases by applying at least one of electric energy and illumination energy thereto.

14. The apparatus of claim 13, wherein the ferroelectric material is a lead lanthanum zirconate titanate (PLZT).

15. The apparatus of claim 14, wherein the PLZT is PLZT 7.6/70/30.

16. The apparatus of claim 15, wherein the first phase of the material is antiferroelectric and the second phase is metastable ferroelectric.

17. The apparatus of claim 14, wherein the PLZT is PLZT 7.7/70/30.

18. The apparatus of claim 17, wherein the first phase of the material is antiferroelectric and the second phase is bias-stabilized ferroelectric.

19. The apparatus of claim 11, wherein the write-erase light means illuminates a portion of the disk, the means for applying an electrical potential across the disk and the light means operating together so that characteristics of the disk means at an illuminated 20. The apparatus of claim 19, wherein the characteristics are thresholds of the phase transition between antiferroelectric and metastable ferroelectric phases.

21. The apparatus of claim 19, wherein the characteristics are thresholds of the phase transition between antiferroelectric and bias-stabilized ferroelectric phases.

22. The apparatus of claim 3, wherein the read means includes means for directing a light beam onto the disk means at an incidence angle of 90 degrees to the surface of the disk means.

23. The apparatus of claim 22, wherein the read means further includes means for measuring the short-circuit photocurrent across the disk means;

a collimating means for collimating the read light beam;

a focusing means for focusing the read light beam;

a polarizing beam-splitter to split the read light beam;

a light beam polarization analyzing means; and a photodetecting means.

24. The apparatus of claim 23, wherein the optical disk means includes a layer of ferroelectric material.

25. The apparatus of claim 24, wherein the layer of ferroelectric material is capable of shifting between stable first and second phases by applying at least one of electric energy and illumination energy thereto.

26. The apparatus of claim 25, wherein the ferroelectric material is a lead lanthanum zirconate titanate (PLZT).

27. The apparatus of claim 26, wherein the PLZT is PLZT 7.6/70/30.

28. The apparatus of claim 27, wherein the first phase of the material is selected from the group consisting of antiferroelectric, penferroelectric and paraelectric phases and the second phase is ferroelectric.

29. The apparatus of claim 26, wherein the PLZT is PLZT 7.7/70/30.

30. The apparatus of claim 29, wherein the first phase of the material is selected from the group consisting of antiferroelectric, penferroelectric and paraelectric phases and the second phase is ferroelectric.

* * * * *